J. H. BOLITHO.
TURBINE.
APPLICATION FILED SEPT. 4, 1908.

927,023.

Patented July 6, 1909.
5 SHEETS—SHEET 1.

Attest:
Erle W. Miller
N. W. Winters

Inventor:
John H. Bolitho,
By J. E. Sweet, Atty.

J. H. BOLITHO.
TURBINE.
APPLICATION FILED SEPT. 4, 1908.
927,023.
Patented July 6, 1909.
5 SHEETS—SHEET 2.
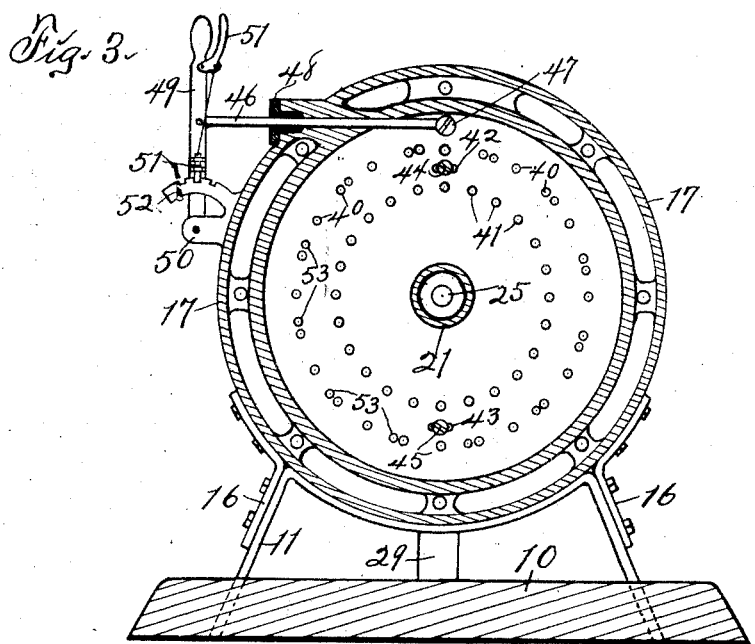
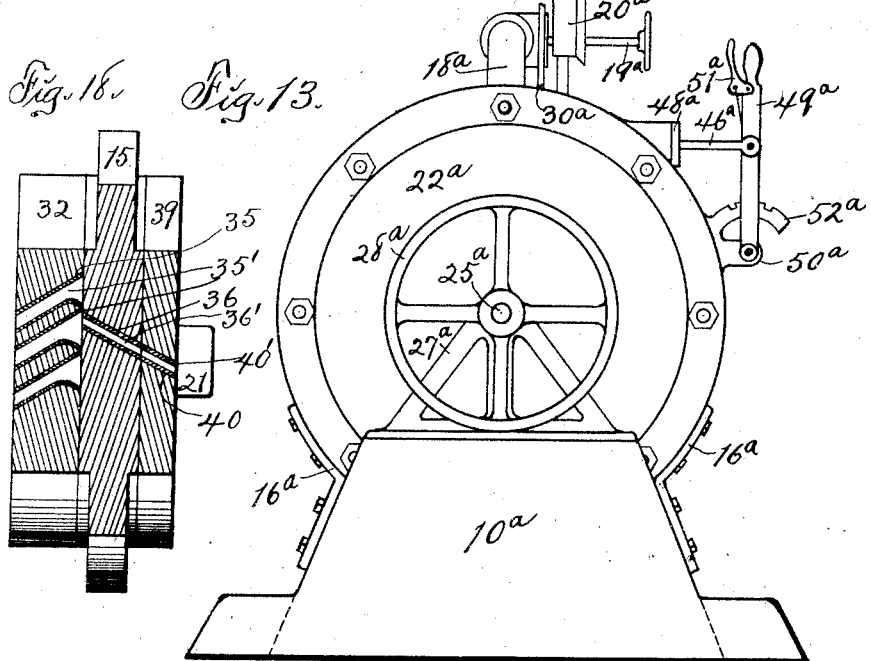
Attest:
Erle W. Miller
N. W. Winters
Inventor:
John H. Bolitho,
By J. C. Sweet Atty

J. H. BOLITHO.
TURBINE.
APPLICATION FILED SEPT. 4, 1908.

927,023.

Patented July 6, 1909.
5 SHEETS—SHEET 3.

Attest:
Erle W. Miller
N. W. Winters

Inventor:
John H. Bolitho,
By J. C. Swert, Atty

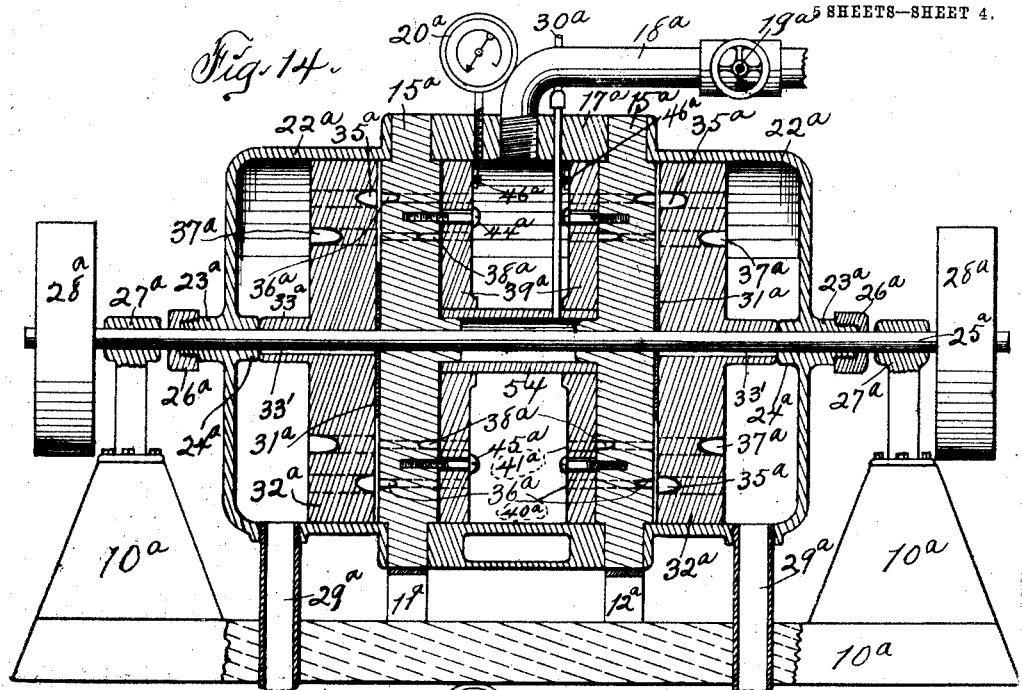
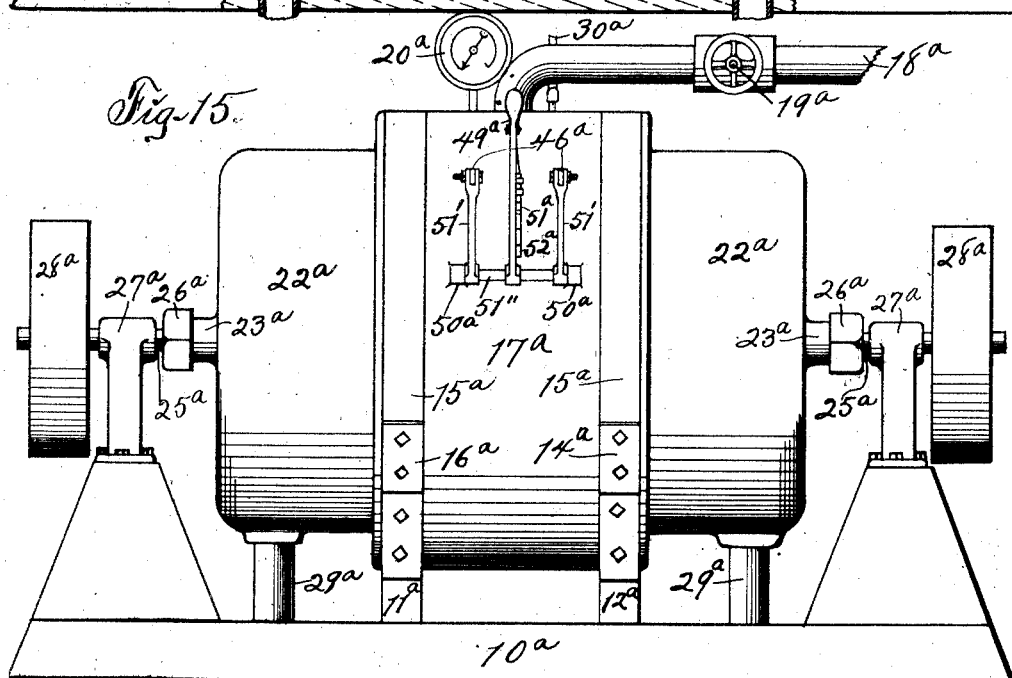

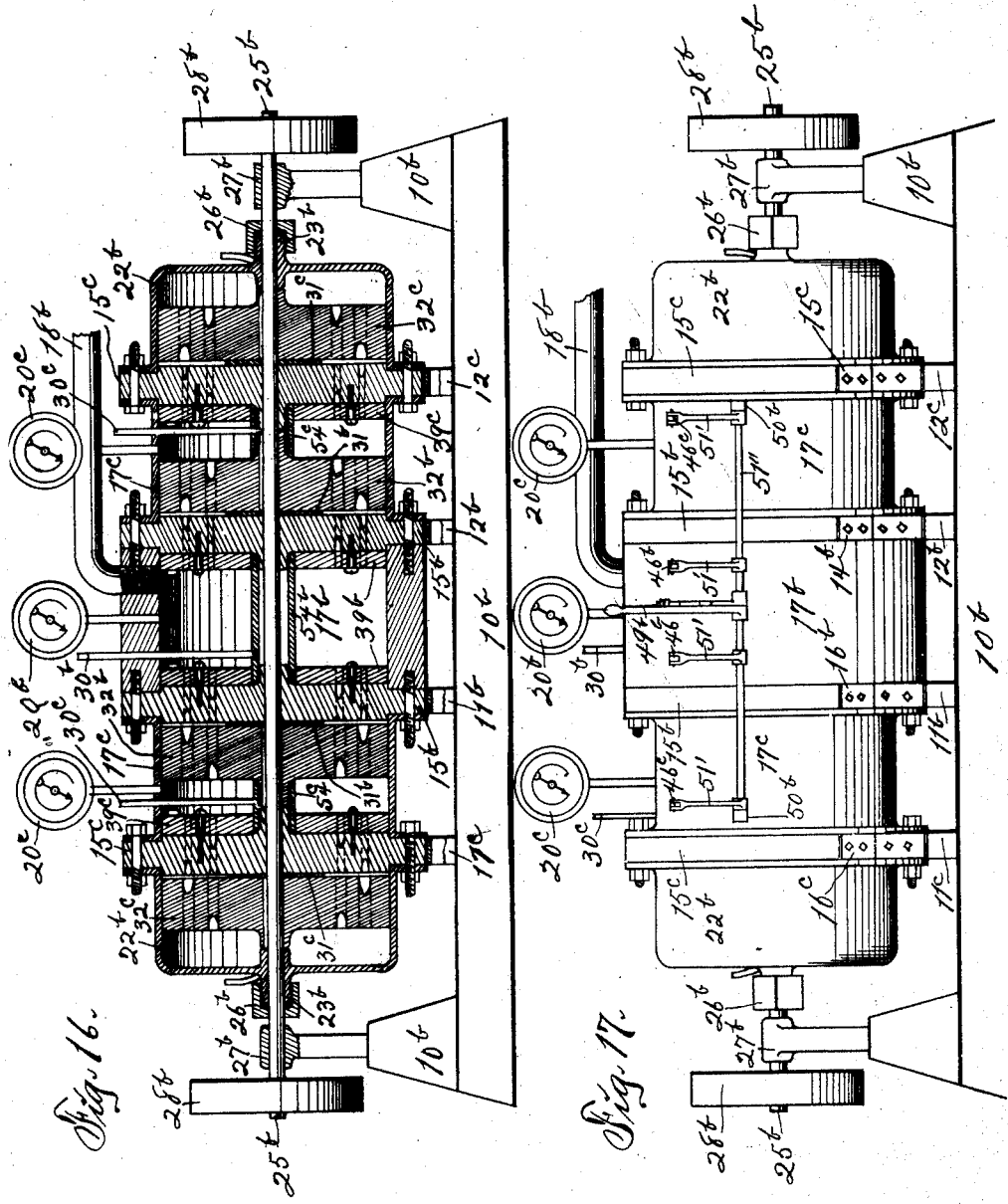

UNITED STATES PATENT OFFICE.

JOHN H. BOLITHO, OF BOONE, IOWA.

TURBINE.

No. 927,023.  Specification of Letters Patent.  Patented July 6, 1909.

Application filed September 4, 1908. Serial No. 452,162.

*To all whom it may concern:*

Be it known that I, JOHN H. BOLITHO, a citizen of the United States of America, and resident of Boone, Boone county, Iowa, have invented a new and useful Turbine-Engine, of which the following is a specification.

The object of this invention is to provide an improved construction for turbine engines adapted to be driven by air, water or steam.

A further object of this invention is to provide improved rotary pistons for turbine engines.

A further object of this invention is to provide an improved construction for double turbine engines.

A further object of this invention is to provide an improved construction for compound turbine engines.

A further object of this invention is to provide means for reversing a turbine engine.

A further object of this invention is to provide means for reducing the use of motive fluid in a turbine engine without reducing or cutting off the speed or power of the engine.

A further object of this invention is to provide means of preëxpansion of motive fluid, such as steam, prior to the application thereof to the piston or pistons of the engine.

A further object of this invention is to provide an improved means for lubricating the moving parts of a turbine engine.

A further object of this invention is to provide an improved construction for the base and pedestals of a turbine engine and the means of connecting the engine parts thereto.

My invention consists in the construction, arrangement and combination of elements hereinafter set forth, pointed out in my claims and illustrated by the accompanying drawing, in which—

Figure 1:
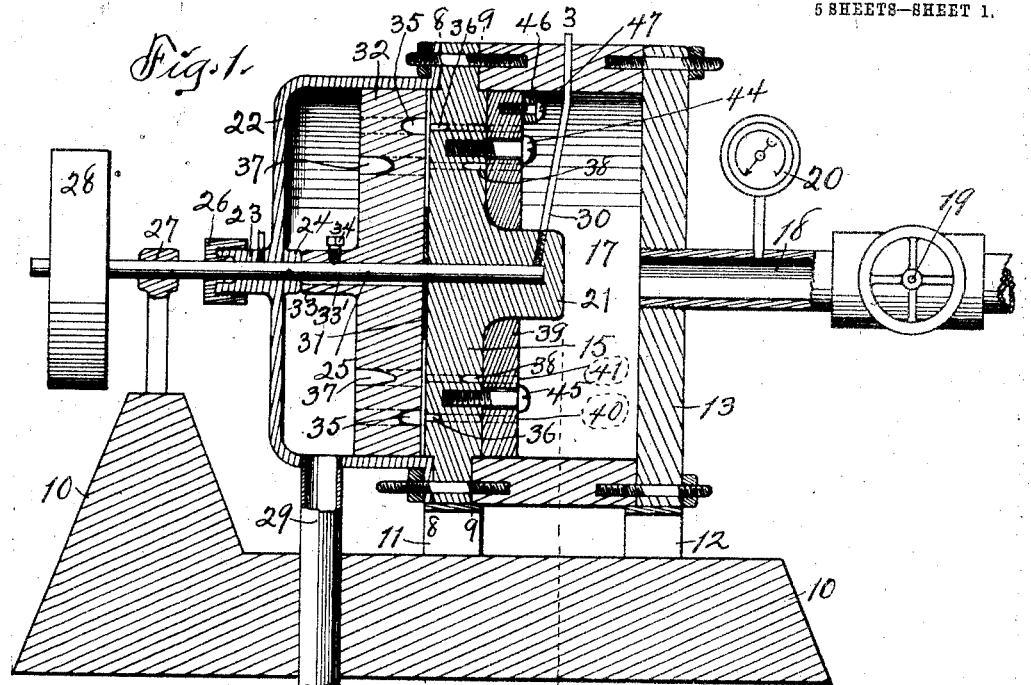
Figure 2:
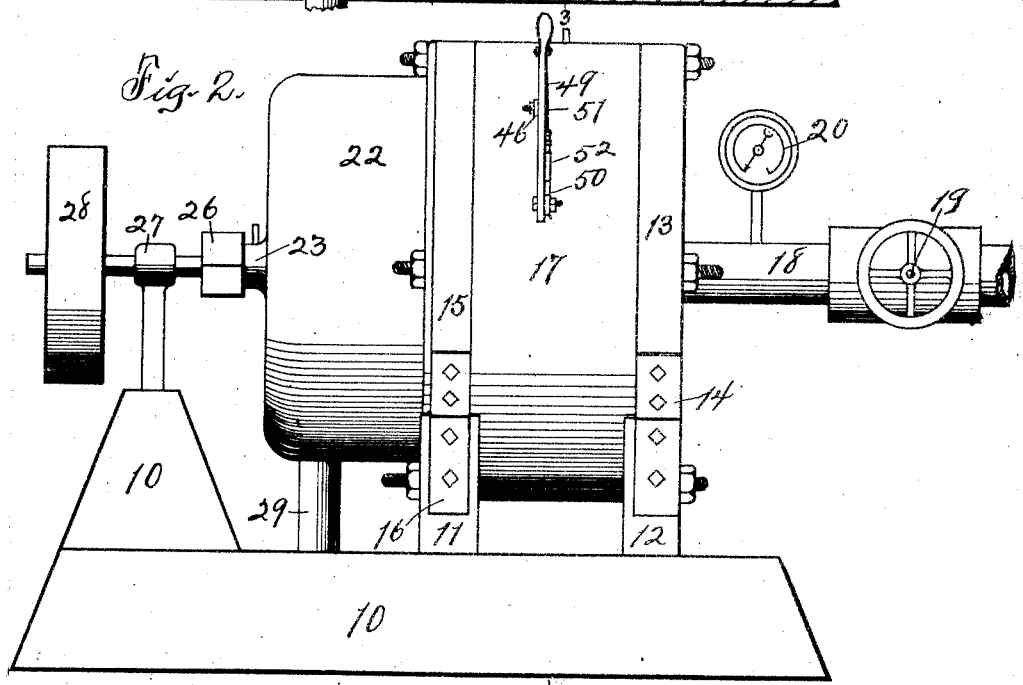
Figure 4:
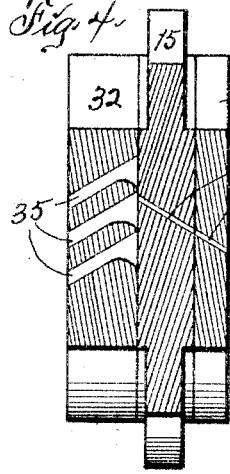
Figure 5:
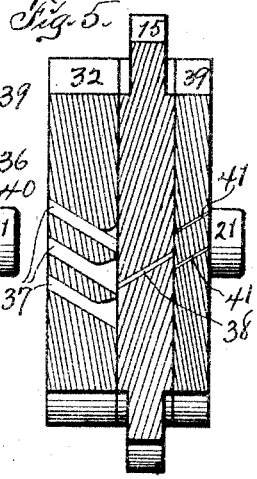
Figure 8:
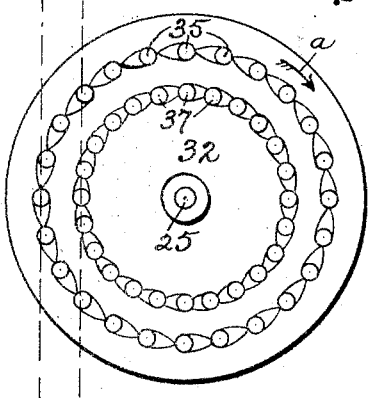
Figure 7:
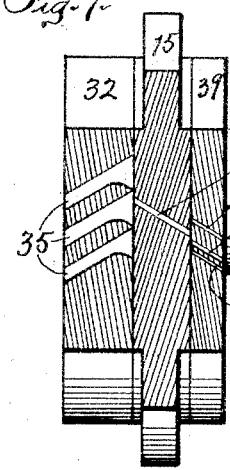
Figure 6:
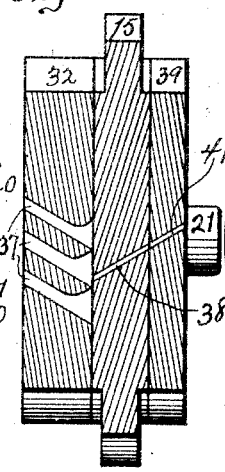
Figure 9:
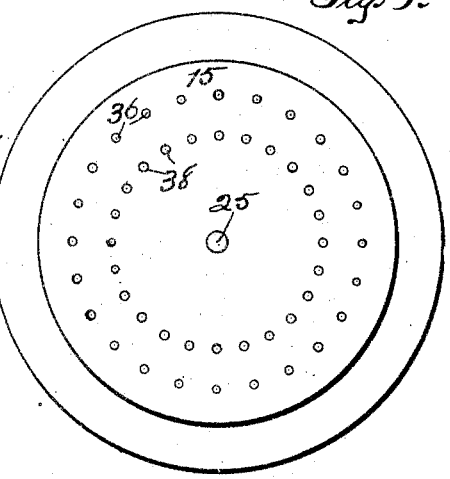
Figure 10:
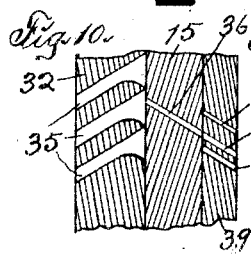
Figure 11:
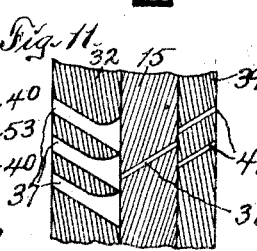
Figure 12:
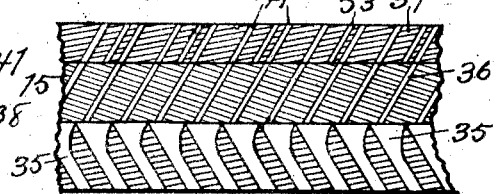

Figure 1 is a diametrical section of the simple form of reversible engine. Fig. 2 is a rear elevation of the same. Fig. 3 is a cross-section of the same on the indicated line 3—3 of Figs. 1 and 2. Fig. 4 is a chord section showing the parts adjusted for full-use forward movement of the piston, on the indicated line 4—4 of Fig. 8. Fig. 5 is a chord section on the indicated line 5—5 of Fig. 8 showing the passages employed for reversing to be closed while the adjustment obtains for full-use forward movement of the piston. Fig. 6 is a chord section on the indicated line 5—5 of Fig. 8 showing the parts adjusted for reverse movement of the piston. Fig. 7 is a chord section on the indicated line 4—4 of Fig. 8 showing the passages employed for full-use forward movement of the piston to be closed while the adjustment obtains for reverse movement of the piston. Fig. 8 is a side view of one of the pistons, as indicated by the line 8—8 in Fig. 1. Fig. 9 is a face view of one end portion of a cylinder or pressure chamber as indicated by the line 9—9 of Fig. 1. Fig. 10 is a chord section on the indicated line 4—4 of Fig. 8 illustrating the parts adjusted for reduced-use forward movement of the piston. Fig. 11 is a chord section on the indicated line 5—5 of Fig. 8 showing the relations of the ports employed for reverse movement of the engine during the adjustment for reduced-use forward movement of the piston. Fig. 12 is a projected diagram illustrating the direction of the ports, through the piston, that are employed for full or reduced-use forward movement of the piston. Fig. 13 is an end elevation of a double-acting form of my improved engine. Fig. 14 is a diametrical section of the engine shown in Fig. 13. Fig. 15 is a rear view of the engine shown in Figs. 13 and 14. Fig. 16 is a diametrical section and Fig. 17 a rear elevation of a double-acting compound form of my improved engine. Fig. 18 is a chord section showing the lining tubes.

In the construction of the machine as shown in Figs. 1, 2, 3, 4, 5, 6, 7, 8, 9, 10, 11 and 12, the numeral 10 designates a base or bed of any suitable construction and 11, 12 pedestals fixed to and rising from said bed. An end plate 13, preferably of circular form, is mounted on the pedestal 12 and is fixed thereto by brackets 14. An end plate or disk 15, preferably of circular form, is mounted on the pedestal 11 and secured thereto by brackets 16. The end plates 1 and 15 preferably are of the same diameter and are arranged parallel with each other and spaced apart. A cylinder rim or band 17 is mounted between the peripheral portions of the plates 13, 15 and are secured thereto by bolts in any desired manner. The joints between the plates 13 and 15 and the rim 17 are steam-tight and may be packed, if desired, in any suitable manner. The plates 13, 15 and rim 17 form a steam chest or pressure chamber and an ingress pipe 18 communicates with said chamber through the center of the plate 13 and leads from a source of supply not shown. A throttle valve 19 is mounted in the ingress pipe 18 and a pressure-indicator 20 is mounted on and communicates with the interior of said pipe. The end plate or disk 15 is formed with a hub or boss 21 on its center and projecting into the chamber described. A cylinder of circular form 22 is provided and comprises a rim, an integral head and a flange. The cylinder 22 preferably is of the same interior diameter as the pressure chamber and the flange of said cylinder is secured to the peripheral portion of the disk 15 by bolts in any desired manner. The head of the cylinder is formed with hubs or bosses 23, 24 on its center and projecting outward and inward respectively. The bosses or hubs 21, 23 and 24 are bored to form bearings and a shaft 25 is mounted for rotation therein. The hub 23 is exteriorly threaded and a gland or stuffing box 26 is mounted thereon and surrounds the shaft 25. A bearing 27 is mounted on the base 10 and the shaft 25 passes through said bearing and carries a pulley 28 on its outer end portion. Any desired means of power transmission may be substituted for the pulley 28. An exhaust pipe 29 leads from the cylinder 22. An oil-pipe 30 is mounted through the rim 17 and extends through the pressure chamber to and communicates with the bearing in the hub or boss 21. A washer 31 is mounted loosely on the shaft 25 in contact with the face of the disk 15 toward the cylinder 22 and a piston 32 is mounted on said shaft within the cylinder. The piston 32 is formed with a hub 33 adapted for engagement with the hub 24 and said hub on the piston is secured to the shaft 25 preferably by a set screw 34. It is the function of the contacting hubs 33 and 24 to take the end thrust of the piston 32 and shaft 25, in the single engine. The piston 32 is formed with an annular row of ports 35 concentric with and adjacent its periphery. The piston is of cylindrical form and of approximately the same diameter as the cylinder 22. The ports 35 cross the piston 32 from end to end and form angles of approximately sixty degrees with the plane ends of the piston. The ports 35 are of any desired cross-section, round, square or as desired and preferably are of uniform diameter throughout except they are enlarged in one direction at their initial ends (Figs. 4 and 8) that they may take motive fluid almost continuously. A plurality of annular rows of the parts 35 may be provided if desired, said ports trending in the same inclination to the faces or ends of the piston. The disk 15 is formed with an annular row of ports 36 concentric with its periphery. The row of ports 36 is directly opposite the row of ports 35, and at times said ports register at their adjacent ends. The ports 36 extend obliquely through the disk 15 from end to end and are at angles of approximately sixty degrees to the ends of said disk. The inclination of the ports 36 is opposite that of the ports 35. The ports 36 preferably are of less diameter than the ports 35 and said ports 35 and 36 may differ in number if desired.

As thus far described the engine is of a simple, single, one-way type and is operated by the admission of motive fluid, either steam, air or water, through the pipe 18, under control of the valve 19, to the chest or pressure chamber, and the passage of said fluid in jet form through the ports 36, 35, the cylinder 22 and the exhaust 29. In passing through the ports 36, the jets of motive fluid impact with the walls of the ports 35, and, on account of the different inclination of the latter ports, revolves the piston in the direction of the arrow $a$ in Fig. 8. The end thrust of the shaft and piston is taken up by the contacting shoulders or hubs 24, 33 and the motion of the piston and shaft is transmitted through the pulley 28, or other device substituted therefor.

It is desirable to provide for reversing the motion of the shaft 25 and to that end an annular row of ports 37 (Figs. 5 and 6) is formed in the piston 32 concentric with the row of ports 35. The ports 37 incline opposite to the ports 35 and extend through the piston from end to end, and at angles of approximately sixty degrees to the ends of the piston. The initial ends of the ports 37 are enlarged in one direction similarly to that of the ports 35. The ports 37 are of any desired cross-section. The disk 15 also is formed with an annular row of ports 38 concentric with the annular row of ports 36. The row of ports 38 is directly opposite the row of ports 37 and at times said ports register at their adjacent ends. The ports 38 extend obliquely through the disk 15 from end to end and are at angles of approximately sixty degrees to the ends of the disk. The inclination of the ports 38 is opposite that of the ports 37. The ports 38 are preferably of less diameter than the ports 37 and may differ in number therefrom if desired. A valve 39 is mounted within the chest or pressure chamber and is journaled for rotation on the boss or hub 21. One face of the valve 39 is ground to fit an adjacent ground face of the disk 15 and the diameter of the valve is adjusted closely to the inner diameter of the chest or pressure chamber, so that the joint between contacting faces of the valve and disk is fluid-tight. An annular row of ports 40 is formed in the valve 39 concentric with and adjacent to the periphery of said valve. The ports 40 incline in the same direction as the ports 36. The row of ports 40 is directly opposite the row of ports 36 and at times said ports register at their adjacent ends. An annular row of ports 41 is formed in the valve 39 concentric with the row of ports 40. The row of ports 41 is directly opposite the row of ports 38, and at times said ports register at their adjacent ends. The inclination of the ports 41 is the same as that of the ports 38. It may be stated here that there are as many rows of ports 36 as of 35, of ports 38 as of ports 37, of ports 40 as of ports 36 and of ports 41 as of ports 38. Segmental slots 42, 43 are formed in the valve 39 at diametrically opposite points and screws 44, 45 are mounted through said slots and seated in the disk 15. A reach arm 46 is pivoted at its inner end on a stud 47 on the valve 39 and extends through a stuffing box 48 in one side of the chest or pressure chamber. The outer end portion of the reach arm 46 is pivoted to a lever 49 fulcrumed on a bracket 50 fixed to the outside of the rim 17. The lever 49 is provided with detent devices 51 adapted to engage a quadrant 52 carried by the bracket 50 and rim 17. The ports 40 and 41 are so arranged that their inner ends, adapted to register with the ports 36, 38, are not on the same radial lines, and, therefore, when the ports 40 register with the ports 36 the ports 41 are out of registration with the ports 38. The valve can be adjusted, by manipulation of the lever 49, so that the ports 40, 36 and 35 register (see Fig. 4) and the motive fluid passes through them and drives the piston 32 in one direction, which may be termed full-use ahead, for the reason that said ports are the nearest to the periphery of the piston and the motive fluid passing through them exerts the maximum of its force and volume. Or, the valve can be adjusted, by reverse movement of the lever 49, so that the ports 40, 36 and 35 are out of registration (see Fig. 7) and the ports 41, 38 and 37 are in registration (see Fig. 6), at which time the motive fluid passes through the ports 41, 38, 37 and drives the piston 32 in a reverse direction. In the adjustment of the valve 39, by the lever 49, there is a period at which the passage of the motive fluid through the disk 15 might be cut off by the valve. This condition is not desirable in that it would cause the entire pressure of the fluid to be applied to the valve and create too great friction between said valve and the disk for convenient manipulation. I have provided, therefore, a plurality of ports 53 in the valve 39, which ports are in the same row as the ports 40 but less in number preferably not exceeding one-half that of the ports 40 or 36. The ports 53 incline in the same direction as the ports 40 and register at times with some of the ports 36. When the valve 39 is adjusted to cut off the passage through the ports 40, 36 and 35, and before opening the passage through the ports 41, 38 and 37, passage is opened through the ports 53, part of the ports 36 and the ports 35 (see Fig. 10) and the motive fluid passes through them and drives the piston 32 with the same speed in the forward direction, in what may be termed reduced-use ahead. The engine may be operated at full-use ahead, reduced-use ahead and at reverse, according to the adjustment of the valve. The speed, in either direction may be controlled by the throttle valve 19.

In Figs. 13, 14 and 15 I have illustrated the application of the same units to the construction of a double-acting engine in which the parts are duplicated, as will be indicated by the use of the same designating numerals with the addition of the index "a." There are some differences of construction, however, which will now be pointed out. Instead of the end plate 13 another ported disk $15^a$ is employed and the ingress pipe $18^a$ enters through the top of the rim $17^a$, and the pressure indicator $20^a$ is mounted on the rim instead of on the pipe. Another difference is to be found in the threading of the ends of the hubs $21^a$ and the mounting thereon of a tube 54, which tube surrounds and is spaced from the shaft $25^a$ and forms an oil chamber adapted to be supplied through the pipe $30^a$. The tube 54 has the additional function of connecting the central portions of the disks $15^a$ and preventing any spreading thereof that would disturb the steam-tight contact of the valves $39^a$ therewith, and to protect the shaft from pressure of motive fluid in the chamber.

In Figs. 16 and 17 I have illustrated the application of the same units to the construction of a double-acting compound engine in which the parts are duplicated, as will be indicated by the use of the same designating numerals with the addition of the index "b." There are some differences of construction, however, which will now be pointed out. Another pressure chamber composed of a rim $17^c$ and disk $15^c$ and supplied with a piston $32^c$ and valve $39^c$ with their appurtenances, is mounted between the pistons $32^b$ and the cylinders $22^b$. Each of the pressure chambers added is also provided with a pressure indicator $20^c$. All of the pistons are secured to a common shaft $25^b$. In the operation of the double, compound engine the motive fluid, preferably steam in this instance, passes both ways from the pressure chamber and drives the pistons $32^b$, then expands in the pressure chambers within the rims $17^c$ and passes through and drives the pistons $32^c$ and then exhausts through the cylinders $22^b$ and exhaust pipes $29^b$.

In the use of either form of engine there is a preëxpansion in the initial pressure chamber or chest prior to the application of the fluid to the piston or pistons. This preëxpansion may be illustrated by presuming the use of steam as motive fluid and a boiler pressure of two hundred pounds. It may be necessary to use only eighty pounds pressure to drive the engine with a given load. In that event the passage of steam to the pressure chamber would be throttled by the valve 19 to such extent that when the preexpansion takes place the pressure in the chamber would be eighty pounds, effective pressure.

An oil hole 33' is formed in each boss 33 and piston 32 for the purpose of leading oil to the bearing of the piston hub 33 on the hub 24.

Assuming that full pressure, from the source of supply, less the preëxpansion of expansive fluids in the pressure chamber, is necessary to overcome inertia and attain desired speed in the engine, when such speed is attained through the use of all the "go-ahead" ports in the disk and valve, the pressure can be reduced or throttled by the valve 19 to a material degree, thus effecting a saving of motive fluid and a consequent saving in the means of producing such fluid, such as fuel and labor. Such reduction or throttling of the motive fluid pressure might result in an undesirable reduction of speed of the engine if all the "go-ahead" ports of the disk or disks 15 were left open on account of the too rapid use of motive fluid. If, however, the valve 39 is adjusted to median position simultaneous with the throttling of pressure, the use of motive fluid, in respect of quantity, would be correspondingly reduced. At the same time the pressure in the chamber would be maintained at the same degree or increased slightly through such non-use and the velocity of the fluid through the remaining open ports in the disk or disks 15 would be sufficient to maintain the desired speed of the engine. It is not velocity alone that impels the piston in the passage of motive fluid through the ports of the disk and impact or pressure thereof in the ports of the piston. In addition to such velocity as may be present, there is an impelling force in the pressure of the motive fluid obliquely in passing through the ports of the piston, and there is a further pressure in the expansion of expansive fluids in the ports in the piston of larger diameter than the ports of the disk.

The ports 35 may be lined with tubes 35' adapted to take the wear of friction with the motive fluid and protect the bridges between the ports.

I claim as my invention—

1. A turbine engine, comprising a pressure chamber, means for supplying motive fluid to said chamber, one wall of said chamber formed with an annular row of ports, each of said ports circular in cross-section and extending through said wall obliquely, a shaft journaled axially of said wall, a piston on said shaft, said piston formed with an annular row of ports opposite to and of greater diameter than the row of ports in the wall and inclined opposite thereto each of the ports in the piston circular in cross-section, throughout a major portion of its length and enlarged in one direction only at one end, a cylinder inclosing said piston, said shaft journaled in said cylinder, and means of exhaust from said cylinder.

2. In a turbine engine, a stationary disk formed with an annular row of ports, each of said ports circular in cross-section and inclined relative to the shortest line through said disk and of uniform diameter throughout, and a piston formed with a row of ports opposite to and of greater diameter than the row of ports in the disk, each of the ports in the piston circular in cross-section and inclined relative to the shortest line through said piston and opposite to the inclination of the port in the disk, each piston port enlarged in one direction only at one end.

3. A turbine engine, comprising a pressure chamber, means for supplying motive fluid to said chamber, one wall of said chamber formed with a plurality of rows of ports each port circular in cross-section, a cylinder, a shaft journaled in the wall and cylinder, a piston on the shaft within the cylinder, said piston formed with a plurality of rows of ports opposite the rows of ports in the wall, the ports in opposing rows inclined oppositely and adapted to register at times at their adjacent ends, the ports in the cylinder circular in cross-section and of larger diameter than the ports in the wall, and means of exhaust from said cylinder.

4. A turbine engine, comprising a pressure chamber, means for supplying motive fluid to said chamber, one wall of said chamber formed with a plurality of rows of ports each port circular in cross-section and of uniform diameter throughout, the ports in one row inclined opposite to an inclination of the ports of another row, a cylinder, a shaft journaled in said wall and cylinder, a piston on said shaft, said piston formed with a plurality of rows of inclined ports opposite to the rows of ports in the wall, the ports in one row in the piston inclined opposite to an inclination of the ports of another row in the piston, the ports of opposing rows inclined oppositely and adapted to register at times at adjacent ends, the ports in the piston circular in cross-section and of less diameter than the ports in the wall, and means for exhaust from said cylinder, together with a valve controlling passage through said ports.

5. A turbine engine, comprising a pressure chamber, means for supplying motive fluid to said chamber, a disk forming one wall of said chamber, said disk formed with a plurality of rows of ports each port circular in cross-section and of uniform diameter throughout, the ports in one row inclined opposite to an inclination of the ports of another row, a cylinder, a shaft journaled in the disk and cylinder, a piston on said shaft, said piston formed with a plurality of rows of inclined ports circular in cross-section and of less diameter than and opposite to the rows of ports in the disk, the ports in one row in the piston inclined opposite to an inclination of the ports of another row in the piston, the ports of opposing rows inclined oppositely and adapted to register at times at adjacent ends, a valve mounted in the pressure chamber, said valve formed with annular rows of ports opposite the rows of ports in the disk and staggered relative thereto each port in the valve circular in cross-section and inclined through the valve, means for adjusting said valve to open and close different rows of ports in the disk, and means for exhaust from said cylinder.

6. A turbine engine, comprising a pressure chamber, means for supplying motive fluid to said chamber, opposite walls of said chamber formed of disks, each disk formed with an annular row of ports, each port circular in cross-section and of uniform diameter throughout and extending obliquely through a disk, a cylinder on the opposite side of each disk from the chamber, a shaft journaled in said cylinders and disks, pistons on said shaft in each cylinder, said pistons each formed with an annular row of ports circular in cross-section and of less diameter than and opposite to the row of ports in the adjacent disk, the ports in the disks inclined opposite each other, the ports in the pistons inclined opposite the inclination of the ports in adjacent disks, and means of exhaust from the cylinders.

7. A turbine engine, comprising a pressure chamber, means for supplying motive fluid to said chamber, opposite walls of said chamber formed of disks, each disk formed with a plurality of rows of ports extending obliquely through the disk, the ports in one row inclined oppositely to the ports in the other row, opposite rows of ports being inclined oppositely, valves in the pressure chamber controlling said rows of ports, a cylinder on the opposite side of each disk from the pressure chamber, a shaft journaled in said cylinders and disks, pistons on said shaft in each cylinder, each piston formed with an annular row of ports opposite each row of ports in the disks, the ports in the pistons inclined opposite the inclination of the ports in adjacent disks and adapted to register at times at adjacent ends, and means of exhaust from the cylinders.

8. A turbine engine, comprising a pressure chamber, means for supplying motive fluid to said chamber, one wall of said chamber formed with an annular row of ports, each port circular in cross-section and of uniform diameter throughout and extending obliquely through said wall, another pressure chamber having one wall formed with an annular row of ports each circular in cross-section and of uniform diameter throughout and extending obliquely through said wall, a cylinder on the latter wall, a shaft journaled in said walls and cylinder, pistons on said shaft within the second chamber and cylinder, each piston circular in cross-section and formed with an annular row of obliquely-arranged ports, the ports in each piston inclined opposite to the inclination of the ports in the adjacent wall and adapted to register therewith at times at adjacent ends, the ports in the second wall of greater diameter than the ports in the first wall and the ports in the second piston of greater diameter than the ports in the first piston, and means of exhaust from said cylinder.

9. A turbine engine, comprising pressure chambers of uniform diameter arranged in series, disks in said chambers arranged in series, cylinders arranged at terminal disks, a shaft journaled in the disks and cylinders, pistons on said shaft within successive pressure chambers and cylinders, means for supplying the initial chamber with motive fluid, means of exhaust from the cylinders, the disks and pistons formed with oppositely inclined ports arranged in opposite annular rows, the ports in each piston of greater diameter than the communicating ports in the adjacent disk, the ports in a disk adapted to register at times with ports in a piston at adjacent ends, the ports circular in cross-section and increasing in diameter serially throughout the several disks and pistons.

10. A turbine engine, comprising a central pressure chamber, means for supplying motive fluid to said chamber, opposite walls of said chamber formed of disks, each disk formed with a plurality of rows of ports extending obliquely through the disk, the ports in one row inclined oppositely to the ports in the other row, opposite rows of ports being inclined oppositely, valves in said pressure chamber controlling said rows of ports, secondary pressure chambers on the opposite side of each disk from the central pressure chamber, disks forming the opposite walls of the secondary pressure chambers, each disk formed with a plurality of rows of ports extending obliquely through the disk, the ports in one row inclined oppositely to the ports in the other row in each disk, cylinders on opposite sides of the secondary disks from the secondary pressure chambers, valves in the secondary pressure chambers controlling the ports in the secondary disks, a shaft journaled in said cylinders and disks, pistons on said shaft within the secondary pressure chambers and cylinders, each piston formed with an annular row of ports opposite each row of ports in the disks, the ports in the pistons inclined opposite the inclination of the ports in adjacent disks and adapted to register at times at adjacent ends, and means of exhaust from the cylinders.

11. A turbine engine, comprising a pressure chamber, one wall of said chamber formed of a disk, a cylinder fixed to said disk, hubs on said disk and cylinder, a shaft journaled in said hubs, means for lubricating the journals of the shaft in the hubs, a piston on the shaft within the cylinder, a hub on the piston engaging a hub on the cylinder, means for lubricating the contacting hubs, the disk and piston formed with opposite rows of oppositely inclined ports adapted to register at times at adjacent ends, and means of exhaust from the cylinder.

12. A turbine engine, comprising a pressure chamber, one wall of said chamber formed of a disk, a hub on the disk, a valve pivoted on the hub and fitting the face of the disk, a cylinder mounted on the disk, a shaft journaled in the cylinder and disk, a piston on said shaft within the cylinder, said piston and cylinder formed with contacting hubs, said disk and piston formed with opposite rows of ports, the ports in one row in the disk inclined opposite to the ports in the other row in the disk, the ports in one row in the piston inclined opposite the ports of the other row in the piston, adjacent or opposite rows in the disk and piston inclined oppositely, the valve formed with ports inclined alike with the ports in the disk and adapted to register therewith at times, a reach arm pivoted to said valve and extending outside the chamber, a lever fulcrumed on the chamber and attached to said reach arm, and means of exhaust from said cylinder.

13. In a turbine engine, a disk formed with concentric rows of oppositely inclined ports each port circular in cross-section, a valve pivoted on and fitting one face of said disk, said valve formed with concentric rows of ports each circular in cross-section and inclined to the direction of and opposite the ports in the disk, means for limiting movement of the valve relative to the disk, a reach rod pivoted to the valve, a lever pivoted to the reach rod and means for latching said lever in different positions.

14. In a turbine engine, a disk formed with concentric rows of oppositely inclined ports, a valve pivoted on and fitting one face of said disk, said valve formed with concentric rows of ports opposite the rows of ports in the disk and inclined alike therewith, said valve also formed with additional ports adapted to register with some of the ports in the disk at times, and means for adjusting said valve rotatively on said disk.

15. A turbine engine, comprising a cylinder, a piston mounted for rotation therein and formed with advance ports and reverse ports, a disk facing said piston and formed with advance ports and reverse ports, and a valve facing said disk and adapted for adjustment to cover and uncover ports of the disk, said valve formed with full-use advance ports, reduced-use advance ports and reverse ports.

16. A turbine engine, comprising a cylinder, a piston mounted for rotation therein, said piston formed with ports, said ports circular in cross-section and of uniform diameter throughout the major portions of their lengths and enlarged at one end only in one direction, a disk facing said piston and formed with ports of less diameter and adapted to register at times with the ports in the piston, means for suplying motive fluid to said disk and means of exhaust from said cylinder.

17. In a turbine engine, a pressure chamber, disks forming end walls of said chamber, each disk formed with a hub, a tube screwed on said hubs, cylinders fixed to said disk, a shaft journaled in said disks and cylinders, pistons on said shaft within the cylinders, the tube surrounding and spaced from said shaft, an oil pipe leading through the pressure chamber and communicating with said tube, means for supplying motive fluid to the chamber, means of exhaust from the cylinders, and communicating ports in the disks and pistons.

18. In a turbine, a piston, inclined ports in said piston and lining tubes in said ports.

19. In a turbine engine, a circular piston, an annular row of inclined ports in said piston, said ports enlarged in one direction at one end, and lining tubes in said ports.

20. In a turbine engine, a circular piston formed with a row of inclined ports, each port circular in cross-section throughout a major portion of its length and enlarged in one direction only at one end.

21. In a turbine engine, a circular piston formed with an annular row of inclined ports, each port circular in cross-section throughout a major portion of its length and enlarged in one direction only at one end, and lining tubes in said ports, said lining tubes also enlarged in one direction only at one end.

22. In a turbine engine, a circular piston formed with concentric annular rows of inclined ports, each port circular in cross-section throughout a major portion of its length and enlarged in one direction only at one end, the ports in one row inclined opposite the ports in the other row, and lining tubes in and conforming in shape to said ports.

Signed by me at Des Moines, Iowa, this 10th day of August, 1908.

JOHN H. BOLITHO.

Witnesses:
S. C. SWEET,
ERLE W. MILLER.